Figure 1:
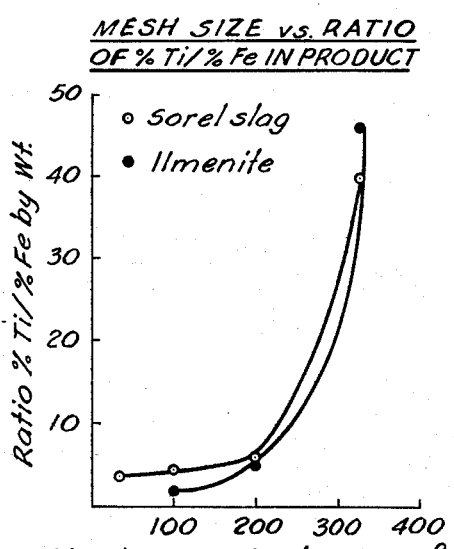

INVENTORS.
James J. Leddy
Dale L. Schechter
BY
ATTORNEY

3,069,235
CAUSTIC BENEFICIATION OF TITANIUM-SOURCE MATERIALS

Dale L. Schechter and James J. Leddy, Midland, Mich., assignors to The Dow Chemical Company, Midland, Mich., a corporation of Delaware
Filed Sept. 25, 1959, Ser. No. 842,429
8 Claims. (Cl. 23—202)

The invention is concerned with beneficiation of iron-contaminated titanium source material.

Titanium and iron occur in a combined state in some ores, e.g., ilmenite. In some instances the ilmenite is processed primarily for its titanium values, e.g., the ilmenite produced in Idaho and Florida of the United States. Some ilmenite is processed principally for its iron content, e.g., that produced in the vicinity of Allard Lake, some of which is processed at Sorel, Quebec, Canada, in which case the titanium is largely present in the by-product slag known generally as Sorel slag.

The separation of titanium values from iron contained in ores and by-product slag has presented many difficulties, a number of which have heretofore not been overcome.

Attempts to separate iron from titanium in source materials in which they are combined have included high temperature treatments such as roasting and fusion, and dissolution of the entire body of ore by hot sulfuric acid at atmospheric pressure. Such known practices are inherently time-consuming and require several steps to effect separation. When attempts have been made to separate the Fe from the Ti by selective dissolution, such as leaching or extraction by such lixiviants as sulfuric acid or hydrofluoric acid, excessive amounts of titanium are lost.

To obtain titanium compounds or titanium metal of acceptable quality from natural sources, present day methods largely employ $TiO_2$. The quality required depends upon the type and use to be made of the titanium compound. For example, for chlorination of a $TiO_2$-containing material to prepare $TiCl_4$ by intermixing the pulverized material with pulverized coke and passing $Cl_2$ or HCl gas therethrough at an elevated temperature, the $TiO_2$-containing material should not contain more than about 1 part Fe to 10 parts Ti by weight, and preferably less than 1 part Fe to 10 parts Ti.

Illustrative of presently employed methods of preparing $TiO_2$ from iron-titanium sources is one which involves the following steps:

(1) Digestion of the ilmenite in an excess of sulfuric acid to convert the iron and titanium compounds therein to the soluble sulfate. (2) Clarification of the solution thus produced which requires treatment in the presence of a coagulating agent such as a soluble sulfide and a proteinaceous material, e.g., glue, to form a floc which carries down colloidal silica and the like, and thereafter decanting off and cooling the titanium-containing solution to crystallize some of the iron-compounds in the solution, followed by filtering to remove thus crystallized iron compounds. (3) Hydrolysis to convert the titanium compounds, present largely as titanyl sulfate, to the insoluble hydrous titanium dioxide. This is a highly critical step requiring especially careful control to insure satisfactory yield. (4) Filtering and washing the hydrous $TiO_2$, usually including repulping with dilute sulfuric acid, filtering and washing to remove more residual iron. (5) Treatment of the precipitate thus produced to remove adsorbed sulfuric acid, by the addition of such conditioning agents as alkali metal or alkaline earth metal oxides and carbonates, and thereafter calcining the resulting mixture to drive off water. (6) Finishing, including pulverizing the $TiO_2$ product and usually slurrying it with water preferably in the presence of an alkali metal silicate or phosphate as a dispersant, and thereafter thickening the slurry as by adding a coagulant such as $MgSO_4$ or NaCl, further grinding, and finally filtering, washing, and drying.

$TiO_2$ thus produced may be used as such in pigments and the like or subsequently be converted to other compounds if desired, e.g., $TiCl_4$ for use in the Kroll or a similar process for the production of titanium metal sponge.

It is clear from a study of the above widely used method that the obtainment of $TiO_2$ from such ores as ilmenite or from by-product slag containing titanium is tedious and costly. A desideratum, therefore, exists for an improved method of obtaining $TiO_2$ of satisfactory quality from ilmenite and similar titanium-bearing ores and slags.

An object of the instant invention is to provide a method which meets the requirement of this desideratum. The manner and means of attaining this and related objects will be made clear in the ensuing description and is specifically defined in the appended claims.

The invention is a method of beneficiating titanium-bearing source material contaminated with iron which consists of heating a mixture of titanium source material in a particulate state with a molten alkali metal hydroxide, e.g., sodium hydroxide, between 350° and 425° C. for from 3 to 8 hours at atmospheric pressure while concurrently introducing oxygen gas. The ratio of the alkali metal hydroxide to the titanium source material is between about 1 and 6 of the hydroxide to 1 of the titanium source material by weight. The oxygen gas is preferably preheated at a temperature of between about 350° and 425° C. and bubbled through the alkali metal hydroxide - titanium source material mixture. Since NaOH is the preferable alkali metal hydroxide to employ, the invention will be described in reference to NaOH hereinafter. The reaction mixture thus produced is cooled to about room temperature, broken into bits, and leached with between a 4 to 12 N hydrochloric acid to remove the acid-soluble iron components formed during the alkali fusion. It is definitely recommended, however, that the fused alkali reaction mixture be first leached with water prior to hydrochloric acid leaching to remove any unreacted alkali metal hydroxide. If desired, the hydrochloric acid leached product may thereafter be further leached with water to wash out adhering acid. However, such final water leach is not necessary since drying at 110° C. or above removes any adhering acid. The leached product is then usually centifuged, washed, and air dried at between about 110° and 150° C. to produce the beneficiated titanium source which usually consists of between about 90 and 93 percent $TiO_2$, i.e., about 54 to 56 percent titanium, and as little as 0.5 percent iron. The extent to which the final product is free of iron is largely due to the conditions employed during the reaction between the titanium source material and the fused alkali metal hydroxide. However, a leach with at least a 6 N hydrochloric acid for at least 5 minutes and preferably for from 0.25 to 1 hour at about 100° C., is necessary to produce a beneficiated material of a satisfactorily low iron content.

The step in the invention of treating the source material with molten alkali metal hydroxide and oxygen, may be carried out in a conventional type reaction vessel, e.g., an open iron pot which is provided with an agitator and a heating means and a pipe leading to an oxygen source, the pipe preferably passing through a heater to preheat the oxygen gas and entering the pot near or at the bottom of the reaction vessel.

After the step of using the sodium hydroxide intermixed with the titanium source material while passing oxygen gas therethrough, the resulting reaction mass may be cooled in the reaction vessel or it may be poured or otherwise transferred from the reaction vessel into a cooling vat, preferably a large open top vat that provides a relatively large cooling area.

The thus cooled reaction product may be pulverized by conventional means, for instance a jaw-type crusher.

The leaching operation may be carried on in a conventional manner, e.g., by placing the crushed reaction product in a vessel provided with a filter (or screen) having openings smaller in size than those of the particles. The leaching liquid, usually water and hydrochloric acid in sequence are passed through the crushed reaction product in the vessel and out through the filter carrying, dissolved therein, the iron and other acid-soluble contaminants of the reaction product, and leaving behind the $TiO_2$ product.

The thus leached titanium product is then water-washed, if deemed necessary, and dried. It is most conveniently dried in a forced air drier at about 120° C.

The sodium hydroxide is preferably added as a solid or paste but may be added as a highly concentrated aqueous solution thereof, e.g., a 75 to 95 percent by weight solution. Water may be advantageously added near the end of the reaction period if desired. The water thus added aids in preventing lumping together of the soluble substances including iron with the insoluble titanium dioxide into a common mass which sometimes interferes with subsequent separation of the titanium values from the iron in the leaching operation.

The following examples are illustrative of the practice of the invention. The titanium source material employed in the examples was either Sorel slag or ilmenite. Table I below sets out the percent by weight composition of each of the titanium source materials employed.

TABLE I

*Analysis of Starting Materials Showing Percent of Significant Metals Present*

| Weight Percent | Sorel Slag | Ilmenite |
| --- | --- | --- |
| Ti | 42.90 | 35.50 |
| Fe | 11.00 | 24.10 |
| Si | 2.01 | 0.09 |
| Al | 2.54 | 0.42 |
| Ca | 0.52 | 0.01 |
| Mg | 3.10 | 0.01 |
| Cr | 0.09 | Nil |
| V | 0.31 | 0.03 |
| Mn | 0.20 | 0.10 |

The procedure observed in the examples was as follows: The weight of either Sorel slag or ilmenite and the weight of sodium hydroxide as a solid material in the amounts set out in Table II were placed in a steel reaction vessel provided with a stirrer, a thermometer, a heating means, and a tube for the introduction of either air or oxygen gas at a point near the bottom of the reaction vessel. The tube for introduction of the gas extended partially across the vessel and contained a number of perforations therein for releasing the gas in several small streams. Either oxygen or air was then introduced so that it bubbled up through the mass and evolved from the surface thereof. The reaction mixture was stirred and heated until a temperature in the range of 400° to 425° C. was reached. Thereafter stirring, introduction of air or oxygen, and temperature of heating were maintained for the length of time set out in Table II.

After the reaction time required had elapsed, the cover of the reaction vessel was then removed, the agitator and the pipe through which the oxygen or air was admitted were removed, and the molten reaction product mixture was poured into a steel tray and cooled therein. The contents of the tray so cooled, solidified into a grayish brown flake-like material which was thereafter broken into small bits, placed in a leaching vessel, and leached twice with 1 to 2 liters of water. The water leachate passing from the leaching vessel was a deep green solution at first but gradually became substantially colorless. The residue remaining in the vessel in each example, which consisted of brown solids, was then leached with 6 N hydrochloric acid for 15 minutes at 100° C. The thus leached product was then centrifuged, air dried at 110° C., and analyzed for the titanium and iron content. The percent of titanium and of iron contained in the thus produced beneficiated titanium source material are also set out in Table II.

TABLE II

| Example No. | Titaniferous Material Used | Sieve Size | Wt. of Slag or Ilmenite in gm. | NaOH in gm. | Reaction Time in Hours | Oxidizing Agent | Percent Ti | Percent Fe |
| --- | --- | --- | --- | --- | --- | --- | --- | --- |
| 1 | Sorel Slag | 325 | 40 | 150 | 6.0 | $O^2$ | 52.0 | 1.5 |
| 2 | do | 325 | 40 | 150 | 6.0 | Air | 46.1 | 8.0 |
| 3 | do | 42 | 40 | 150 | 6.0 | $O^2$ | 44.0 | 10.8 |
| 4 | do | 100 | 40 | 150 | 6.0 | $O^2$ | 46.1 | 9.7 |
| 5 | do | 200 | 40 | 150 | 6.0 | $O^2$ | 47.0 | 7.0 |
| 6 | do | 325 | 160 | 600 | 6.0 | $O^2$ | 53.1 | 1.3 |
| 7 | Ilmenite | 200 | 200 | 600 | 6.0 | $O^2$ | 45.4 | 8.9 |
| 8 | do | 325 | 200 | 600 | 6.0 | $O^2$ | 51.5 | 1.1 |
| 9 | do | 325 | 200 | 600 | 6.0 | $O^2$ | 50.7 | 1.2 |
| 10 | do | 325 | 200 | 600 | 6.0 | Air | 45.2 | 10.9 |
| 11 | do | 325 | 200 | 300 | 6.0 | $O^2$ | 51.7 | 2.3 |
| 12 | do | 325 | 100 | 400 | 6.0 | $O^2$ | 53.9 | 1.4 |
| 13 | do | 325 | 200 | 200 | 6.0 | $O^2$ | 46.7 | 4.3 |
| 14 | do | 325 | 100 | 200 | 6.0 | $O^2$ | 53.0 | 1.8 |
| 15 | Sorel Slag | 325 | 40 | 150 | 3 | $O^2$ | 50.1 | 2.7 |
| 16 | do | 325 | 40 | 150 | 1.5 | $O^2$ | 45.8 | 9.4 |
| 17 | do | 325 | 40 | 150 | 24.0 | $O^2$ | 54.0 | 1.1 |
| 18 | Ilmenite | 325 | 200 | 600 | 6.0 | $O^2$ | 52.9 | 1.1 |
| 19 | do | 325 | 200 | 600 | 3.0 | $O^2$ | 52.0 | 3.1 |
| 20 | do | 325 | 200 | 600 | 1.5 | $O^2$ | 50.0 | 3.4 |
| 21 | do | 325 | 200 | 600 | 24.0 | $O^2$ | 54.4 | 1.2 |

An examination of Table II shows that a beneficiated titanium source material is produced when particulate ilmenite or Sorel slag is treated in accordance with the invention. It is readily descernable from such examination that when the source material is of a particle size sufficiently small to pass through a 325 sieve, clearly superior results are obtained over coarser particle sizes. It also shows that length of time of heating the sodium hydroxide and titanium material should be at least 3 hours and preferably not less than 5 hours, and that 24 hours gave slightly better results. It is to be borne in mind, however, that it has been found after a 6 hour period of treatment of the source material with the alkali, the percent of iron remaining in the charge is so small that further alkali treatment is usually not economically justified.

The table shows that either oxygen or air is satisfactory as an oxidizing agent. There appears to be some advantage in the use of oxygen in that the volume of oxygen required in comparison to air is less.

Seven additional examples, numbered 22 to 29 inclusive were run, four using Sorel slag and three ilmenite, employing the apparatus of Examples 1 to 21 inclusive. In each of Examples 22 to 29, 10 grams of the titanium source material set out in Table I of various sieve sizes and 30 grams of solid NaOH were charged into the vessel, held at between 400° and 425° C., and oxygen gas bubbled therethrough for 6 hours. Each charge thus treated was removed and leached twice with between 1 and 2 liters of water for each leach to remove substantially all the unreacted NaOH and then leached with 6 N hydrochloric acid for 15 minutes. The hydrochloric acid leached product so obtained in each example was analyzed for titanium and iron. The ratio of titanium to iron by weight calculated from these analyses is plotted against the corresponding sieve size of the source material used, thereby obtaining the curves of FIGURE 1.

Reference to FIGURE 1 shows that the finer size particles produced a higher ratio of titanium to iron and that the particle size has similar effect on the titanium to iron ratio when either ilmenite or Sorel slag is employed.

Another series of four examples was run employing the conditions of Examples 1 to 21 using ilmenite having the analysis set out above, except that a particle size passing through a No. 325 sieve was used and the weight ratio of sodium hydroxide to ilmenite was varied in each example. The weight ratio of titanium to iron in the hydrochloric acid-leached product so produced is plotted against the weight ratio of the sodium hydroxide to ilmenite thereby obtaining the curve of FIGURE 2.

Figure 2:
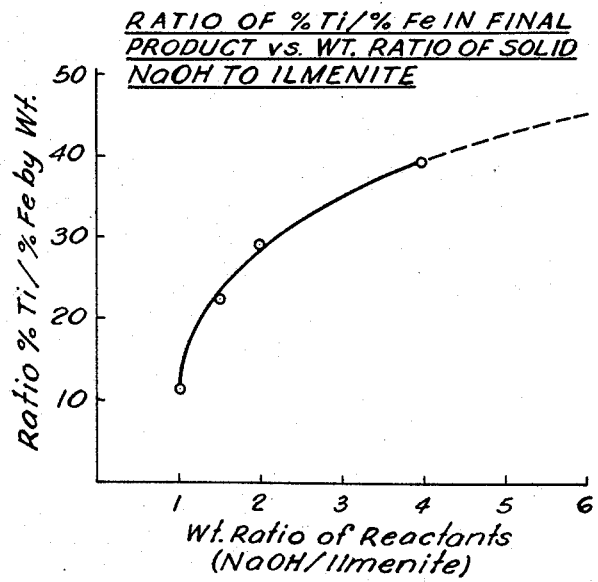

Reference to FIGURE 2 shows that the proportion of titanium to iron in the leached beneficiated titanium source material thus produced is clearly improved by using an increasing proportion of the sodium hydroxide to the ilmenite. However, for practical purposes, e.g., preparation of titanium-bearing feed for chlorination, a weight ratio greater than 2 or 3 NaOH to 1 of the source material would not be used.

Another series of similar examples was run employing the conditions and procedures of Examples 22 to 29 except that the time of fusion with the sodium hydroxide was varied. Ilmenite was employed in three of these examples and Sorel slag in the other three. The hydrochloric acid leach product produced was analyzed for titanium and iron. The weight ratio of Ti to Fe calculated from these analyses is plotted against the reaction time thereby obtaining the curves which are shown in FIGURE 3.

Figure 3:
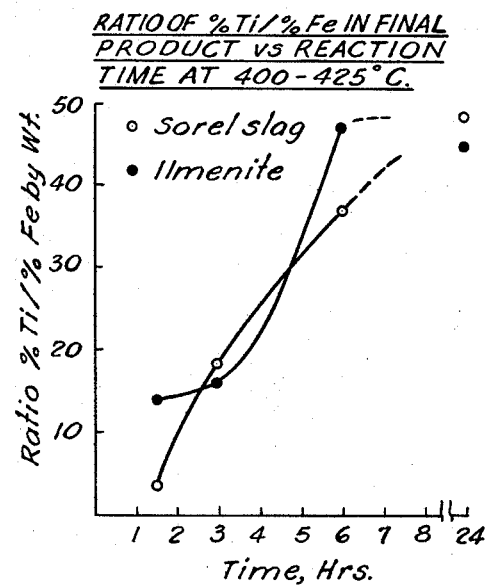

Reference to FIGURE 3 shows that the longer period of fusion or reaction time of the titanium source material and the sodium hydroxide while oxygen was passed therethrough produced a beneficiated titanium source material which was increasingly higher in the ratio of titanium to iron as the period of fusion was increased up to 6 hours. The ratio of Ti to Fe after 24 hours in comparison to that after 6 hours shows that it is uneconomical, generally, to continue the fusion longer than a period of 6 hours for ilmenite and, by interpolation longer than about 8 hours for Sorel slag because the amount of iron remaining in the fused mass after those periods becomes very small. For the preparation of Ti-bearing material according to the invention for use in subsequently chlorinating to $TiCl_4$, about 1 hour is satisfactory and clearly a period beyond 2 to 3 hours would be unnecessary.

The examples of the invention show that a titanium source material contaminated with iron may be advantageously beneficiated and the iron content markedly reduced by the practice of the invention.

Having described the invention, what is claimed and desired to be protected by Letters Patent is:

1. The method of treating titanium-bearing source material contaminated with iron to produce a beneficiated titanium source material low in iron which consists of heating the iron-contaminated titanium source material with substantially solid sodium hydroxide in the ratio of at least 2 parts by weight of sodium hydroxide to 1 part of the titanium source material at a temperature of between about 350° and 425° C. for at least 2 hours while simultaneously introducing a gas containing elemental oxygen to produce therein both iron compounds soluble in hydrochloric acid and titanium compounds insoluble in hydrochloric acid, cooling and separating the insoluble portions of the reaction product containing substantially all the titanium values from the soluble portions thereof containing a substantial portion of the iron originally present in the contaminated titanium-bearing material, pulverizing and acid leaching the insoluble portion thereof.

2. The method of claim 1 wherein iron-contaminated titanium source material and the sodium hydroxide reaction mixture is maintained at a temperature of about 400° C.

3. The method of claim 1 wherein the period of reaction of the titanium source material with the fused sodium hydroxide is between 6 and 8 hours.

4. The method of claim 1 wherein the ratio of sodium hydroxide to the contaminated titanium-bearing material is between 2 and 4 parts by weight of the sodium hydroxide to 1 of the iron-contaminated titanium-bearing source.

5. The method of claim 1 wherein the oxidizing agent is oxygen gas.

6. The method of claim 1 wherein the gas containing elemental oxygen is preheated to a temperature of about 400° C.

7. The method of claim 1 wherein separation is effected by first leaching the pulverized mass with water and thereafter with hydrochloric acid.

8. The method of claim 1 wherein the hydrochloric acid leached reaction mass is thereafter washed with water.

References Cited in the file of this patent

UNITED STATES PATENTS

| 1,325,561 | Farup | Dec. 23, 1919 |
| 1,760,992 | Palmer | Jan. 3, 1930 |
| 2,974,014 | Hoekje et al. | Mar. 7, 1961 |

FOREIGN PATENTS

| 526,628 | Canada | June 19, 1956 |
| 9,515 of 1932 | Australia | Oct. 12, 1933 |